TIME ERROR COMPENSATOR

Filed March 29, 1968 2 Sheets-Sheet 1

INVENTOR.
MAURICE G. LEMOINE
BY Thomas E. Schatzel
ATTORNEY

INVENTOR.
MAURICE G. LEMOINE
BY Thomas Schatzel
ATTORNEY

United States Patent Office 3,532,974
Patented Oct. 6, 1970

3,532,974
TIME ERROR COMPENSATOR

Maurice G. Lemoine, Redwood City, Calif., assignor to Ampex Corporation, Redwood City, Calif., a corporation of California Filed Mar. 29, 1968, Ser. No. 717,321
Int. Cl. G01p 3/12
U.S. Cl. 324—188 6 Claims

ABSTRACT OF THE DISCLOSURE

Time error compensator method and apparatus for establishing a reference signal based on the repetitive relationship of individual pulses of a recycling sequence of pulses. The recycling sequential pulses are received by a presettable delay network and counter network. The counter network provides switching information to a gating means responsive sequentially to individual pulses. The gating means is adjustable to provide successive delay controlling reference pulses for presetting the delay network a predetermined amount for each pulse of the sequence.

NATURE OF THE INVENTION

The present invention pertains to a time error compensator and, more particularly, to apparatus and means for sensing the time error between successive pulses.

Though those skilled in the art will recognize numerous applications for the present invention, it has been found highly desirable as a means and apparatus for providing signals indicative of the positional relationship of a rotating member, e.g., a high-rate-of-information tachometer.

Servo controlling the speed and position of rotating members is well known in various technical arts including video tape recorders. Servo controlling in video tape recorders commonly includes incorporation of tachometer assemblies to provide signals which are converted to error signals indicating positional and/or speed errors in driving capstans or rotating head drums. Though a high degree of accuracy is mandatory, the introduction of portable video tape recorders has placed a demand for still further accuracy. Portable tape recorders are subject to considerable vibration compared to studio or stationary recorders. Thus, the transient response and frequency response of the portable unit must be considerably more—otherwise the mechanical vibrations tend to cause disruptions not immediately corrected—necessitating a high rate of information from the tachometer.

High-rate-of-information tachometers having various slots machined about the periphery, for example as used in the servo-controlled head drum of a video tape recorder, have heretofore required a high degree of machining precision as to slot position and size. Where large servo loop gains are necessary, as in portable tape recorders, the required precision approaches the limit of the present state of the art. Otherwise, the servo loops interpret the mistiming of the bits due to mechanical imperfections as variations of speed to be corrected. The misinterpreted error is amplified in the loop tending to cause saturation of the motor driving amplifier.

Prior approaches to overcome this problem include the incorporation of integrating-type tachometers; however, integrating-type tachometers are expensive to manufacture and there is a high rate of rejects due to machining errors. Also, glass disc tachometers may be incorporated but they are difficult to center and are fragile, making them undesirable for applications in portable-type equipment.

Accordingly, it becomes desirable to provide a tachometer type network which is highly precise in its operation, relatively low cost, and not highly sensitive to vibrations.

SUMMARY OF THE INVENTION

The present invention introduces a system and method adaptable for use with a high-rate-of-information tachometer and overcoming the requirement for high precision machining of the tachometer. The system and method provide for the taking of a train of time spaced signals, for example those originating with the tachometer and establishing a reference signal based on a sequence of the train during normal operation. For example, if the reference is based on a sequence of tachometer pulses, which are repeated in sequence for each revolution, compensation is made for machining inaccuracies. Sequential switching of an adjustable delay is introduced such that for each individual pulse of each sequence there is a preset delay.

In a specific embodiment, hereinafter described in greater detail, the sequential pulses from a high-rate-of-information tachometer are simultaneously received by a first presettable delay network and by a second fixed delay network. The second delay network extends to a shift counter network. The shift counter network responds to the pulses, advancing step-by-step and providing sequential switching information to a gate arrangement. The gating arrangement includes individual gates individually and sequentially responsive to the switching information. The gates each feed into a variable resistance network permitting adjustment of the output from the individual gates. The output of the gates extends to a common point to provide a composite reference signal varying in accordance with the adjustment of the individual gates. The composite reference signal comprising the succession of signal outputs is received by the first delay network for presetting the degree of delay of said first network. Each reference signal output presets the presettable delay network for the succeeding pulse of the sequence. Thus, the reference is set to compensate for any "built-in" timing errors between pulses in the normal sequence. Thereafter, deviations in the tachometer speed or position will be accurately reflected in a change in the time spacing between the output signals from the presettable delay network.

DESCRIPTION OF THE PREFERRED EMBODIMENT

Figure 1:
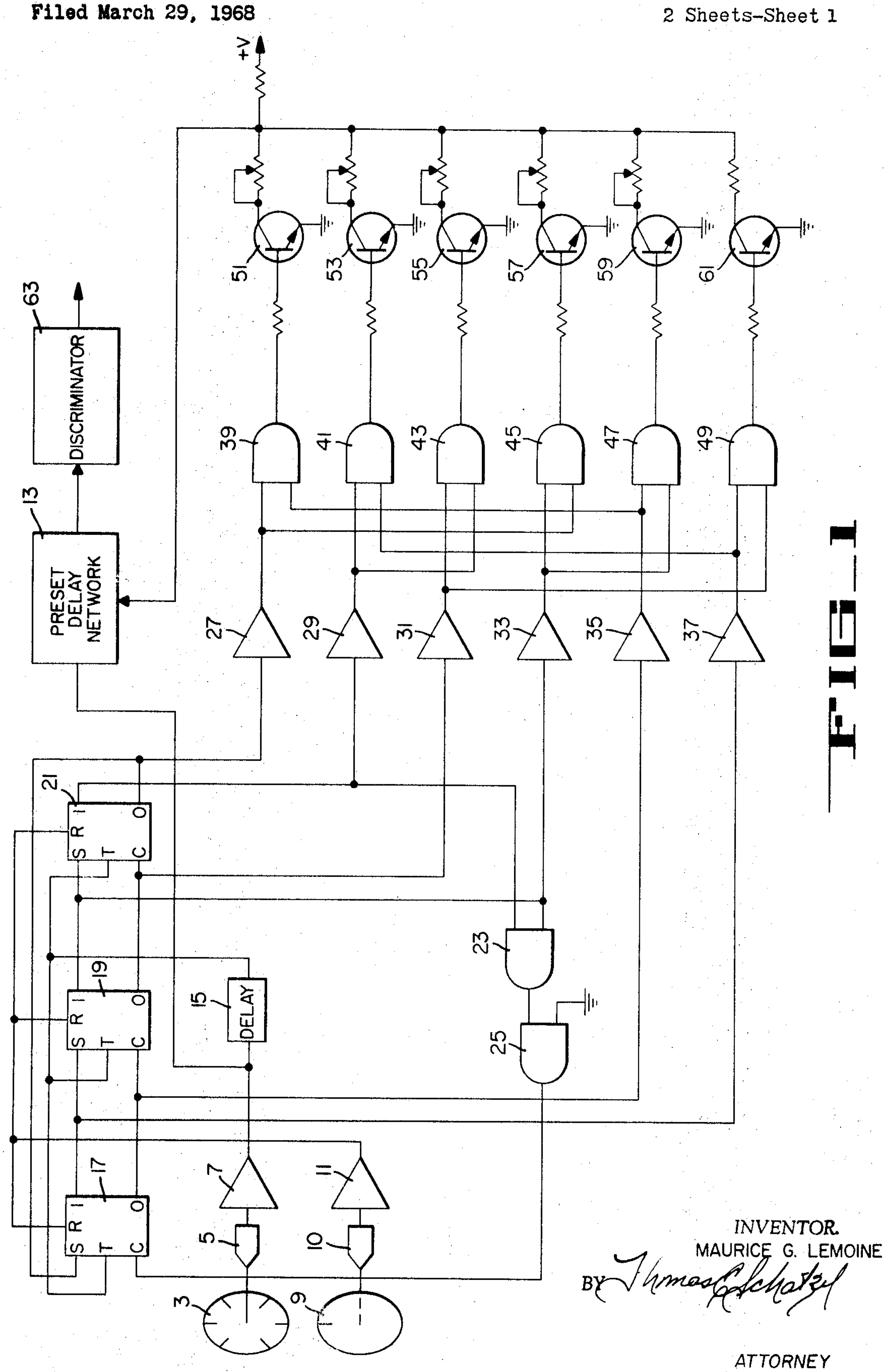
FIG. 1 illustrates a circuit diagram of an arrangement for practicing the teachings of the present invention.

FIG. 1 illustrates a system which has proven highly successful as incorporated in a portable video tape recorder. A six-point tachometer 3 is driven by a motor of a head drum (not shown). The tachometer includes six indexes in this instance in the form of slots spaced approximately sixty degrees apart around the periphery of the tachometer disc 3 and each carrying a magnetic member. A magnetic pick-up 5 responds to each of the slot members providing a sequence of six time spaced signals each revolution. A differential comparator amplifier 7 receives the signals from the pick-up 5. A second tachometer disc 9, hereinafter referred to as the once-around tachometer disc, is also responsive to the head drum motor and provides a signal for each revolution. A magnetic pick-up 10 responds to the magnetic member carried by a slot on the disc 9 and provides a signal to a differential comparator amplifier 11. The output of the amplifier 7 is common to a first delay network 13 providing for presettable delay of successive pulses, e.g., a voltage controlled monostable vibrator, and a second delay 15 providing a fixed delay of each pulse in relationship to the phase of the signals received by the delay 15. The delay 15 may be designed to delay each pulse of the sequence from the amplifier 7 by a prescribed amount, for example thirty degrees.

The signals passing to the delay 15 are processed to provide the presetting reference signal to the network 13. The output of the delay 15 is received by a counter network illustrated as including a shift counter comprising three flip-flop or bistable stages 17, 19 and 21. The shift counter circuitry provides a division by six corresponding to the number of slots on the tachometer 3 and the number of pulses per sequence. The flip-flops 17, 19 and 21 are tied in cascade with each flip-flop shifting with successive pulses. The delay 15 is common to the "T" input terminal of each flip-flop. The terminal "C" of the flip-flop 19 is tied to the "0" terminal of the flip-flop 17 and the flip-flop 21 terminal "C" is tied to the "0" terminal of the flip-flop 19. The "1" terminal of the flip-flop 17 is tied to the terminal "S" of the flip-flop 19 and the "1" terminal of the flip-flop 19 is tied to the terminal "S" of the flip-flop 21. The "0" terminal of the flip-flop 21 extends to the terminal "S" of the flip-flop 17. Each flip-flop 17, 19 and 21 has a reset terminal "R" common to the amplifier 11. Thus, for each revolution of the tachometer discs 3 and 9, or repetition of the sequence, the counter circuitry is reset with each flip-flop reset simultaneously. The "1" terminal of the flip-flop 21 also extends to a NAND gate 23 the output of which extends to one terminal of a NAND gate 25. The other input terminal of the NAND gate 23 is common to the "1" terminal of the flip-flop 19. The other input of the NAND gate 25 is tied to ground reference and the output is common to the terminal "C" of the flip-flop 17. The NAND gates 23 and 25 are included to suppress spurious pulses, as is common in the counter circuitry art.

The counter network further includes six inverter amplifiers. An inverter 27 and an inverter 29 are respectively tied to the "0" and "1" terminals of the flip-flop 21. An inverter 31 and an inverter 33 are tied to the "0" and "1" terminals, respectively, of the flip-flop 19. An inverter 35 and an inverter 37 are respectively tied to the "0" and "1" terminals of the flip-flop 17. The outputs of the inverters 27–37, inclusive, extend to six logic gates illustrated as NAND gates 39, 41, 43, 45, 47 and 49 responsive to coincidence in the inverted duty cycle signals from associated inverters. The inputs to the gate 39 extend to the inverters 27 and 35. The inputs to the gate 41 extend to the inverters 29 and 37. The inputs to the gate 43 extend to the inverters 31 and 29. The inputs to the gate 45 extend to the inverters 33 and 27. The inputs to the gate 47 extend to the inverters 35 and 33 and the inputs to the gate 49 extend to the inverters 31 and 37.

The NAND logic gates 39–49, inclusive, of the counter network extend to a gating means including six separate on-off transistor gate stages 51, 53, 55, 57, 59 and 61. Each transistor gate has a base resistor intermediate the respective NAND gates and its base. The collector of each of the gates 51, 53, 55, 57 and 59 is tied to a separate variable resistance unique to the associated gate. One terminal of each collector resistor is common to a constant potential V+ and to the preset terminals of the network 13. Thus, the magnitude of the output is dependent upon the value of the individual collector resistors. The stage 61 rather than having a variable resistance is shown as having a fixed precision resistor to provide a reference value for setting the other potentiometers. The output of network 13 extends to a frequency discriminator 63 which is part of the feedback loop in the drum servo and which provides a signal representative of the output of the delay network 13. The discriminator may be of the nature responsive to the trailing edge of the pulses from the delay network 13. As the degree of deviation between successive trailing edges varies, it is reflected in the discriminator output.

Figure 2:
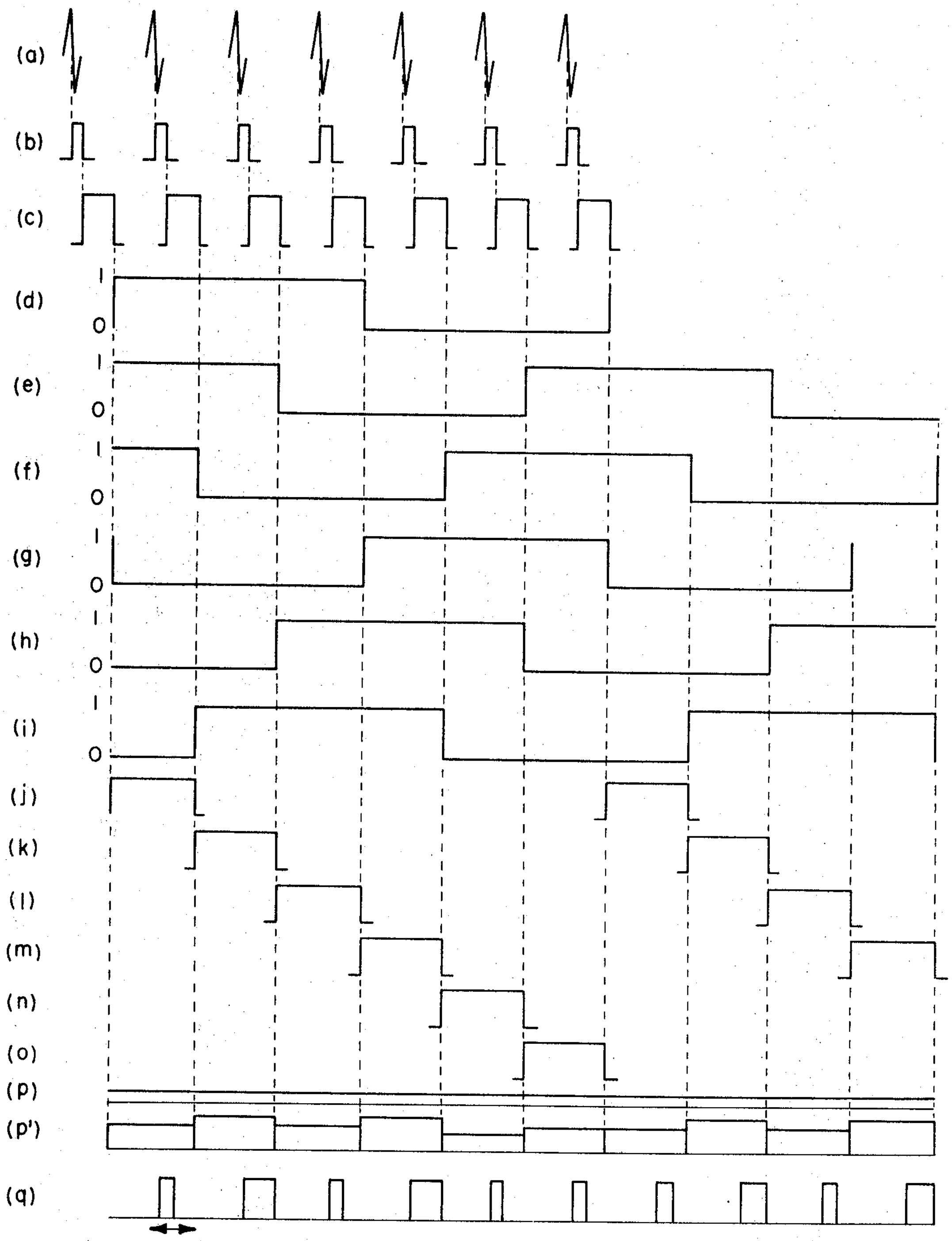
FIG. 2 illustrates a waveform comparison of signals at various points of the circuitry of FIG. 1.

FIG. 2 illustrates various pulse waveforms at various points in the network of FIG. 1. The waveforms designated *a* illustrate a sequence of pulses generated by the magnetic pick-up 5 and received by the differential comparator amplifier 7, in turn providing the sequence of shaped pulses of the waveforms *b* with the leading edges coinciding with the negative-going crossover of the associated pulse of FIG. 2*a*. It may be noted that with the six slots on the tachometer disc 3 that the pulses are respectively spaced approximately sixty degrees, however, due to machining inaccuracies the spacing undoubtedly is not exactly sixty degrees. The signals of waveform *b* pass through the delay 15 which may be designed to delay each pulse by a predetermined amount. Thus, the sequence of pulses to the counter network may be as illustrated by the waveforms *c* with the trailing edges delayed the prescribed amount.

The delay pulses *c* are received at the "T" terminal of each flip-flop 17, 19 and 21. The flip-flops provide 50% duty cycle signals at their respective "0" and "1" output terminals. Accordingly, the output of the "1" terminal of the flip-flop 17 is that as illustrated by the waveform *d*. The third pulse of waveform *c* causes the flip-flop 19 to provide an output at its "1" terminal as illustrated by the waveform *e*. The trailing edge of the fifth pulse of waveform *c* results in the flip-flop 21 conducting with the output waveform at its "1" terminal illustrated by the waveform *f*. Due to the nature of the flip-flops 17, 19 and 21, the output at the "0" terminals of the respective flip-flops is the reciprocal of the waveform on the "1" terminal. Accordingly, the waveforms *g*, *h* and *i* illustrate the output at the "0" terminal of the flip-flops 17, 19 and 21, respectively. These waveforms are received and inverted by the associated inverters 27–37, inclusive. The inverters in turn are tied into the various NAND gates 39–49, inclusive. Due to the nature of the NAND gates, there is only an output when a negative signal is on both of the inputs. For example, viewing the NAND gate 39 it may be noted that it has an output signal only when the output of the inverter 27 and 35 are negative. Referring to the waveforms *g* and *i* with reoriented polarity due to the inversion of the inverters 27 and 35, it will be noted that this occurs only during one-sixth of each revolution of the tachometer 3. The gating signal from NAND gate 39 is illustrated by waveform *m*. Viewing the NAND gate 43 it may be noted that it is responsive to the waveforms *f* and *h*. The waveforms *f* and *h*, in conjunction with their respective inverters 29 and 31, provide simultaneous negative signals part of the time for each revolution and the gating signal appears as illustrated by waveform *n*. Thus, the gating signals from the NAND gates 41, 45, 49, 39, 43 and 47 appear as illustrated by diagrams *j*, *k*, *l*, *m*, *n*, and *o*, respectively. Accordingly, the signals *j–o* turn on the transistor gates 51–61, in the foregoing sequence. Each of the transistors conduct for approximately one-sixth of each revolution. With one of the transistors 51–61 conductive the potential at the common terminal of the potentiometers is established by the value of the respective collector resistance. As illustrated by waveform *p*, with all collector resistors accurately set and precise machining of the tachometer slots such that there is no time error between the sequential pulses, the control signal to the network 13 could be set at a constant value so that the preset would be the same for all pulses received by the network 13 from the comparator amplifier 7. Unfortunately, imperfections in the indexes on the discs 3 preclude exact timing between pulses of the sequence from the comparator amplifier 7. However, by providing the variable potentiometers in the collectors, the composite reference signal at the output of the transistor gates can be adjusted for each pulse of the sequence as indicated by the waveform *p'*. A monostable multivibrator may be used as a delay network 13 with the degree of delay established in accordance with the magnitude of the present voltage. Thus, each pulse of the reference signal *p'* may be of a select magnitude to preset the delay, for the following sequential pulse from the comparator amplifier 7. The reference pulses in essence determine the position of the trailing edge of the output pulses from the delay network 13. Waveform *q* illustrates the output from the delay network 13. Analyzing *q* with relation to *p'* indicates that as the magnitude of *p'* varies the trailing edge of the following pulse varies. Initially, to set the resistance of the potentiometers of the transistors 51–61, the system may be operated open loop and driven at a given precise speed. The potentiometers in each of the gates may be preset to provide equal timing between trailing edges of pulses from the delay network 13 such that the output of the discriminator 63 is at a constant value. This indicates that there is no error in the position or speed of the tachometer though there may be time deviations between successive pulses in the sequence from the tachometer. Thereafter, deviations in the time spacing of the trailing edges of the pulses from the delay network 13 will be due to deviations in the sequence of the signals from the comparator amplifier 7 caused by slight speed and position variations of the rotating tachometer.

I claim:

1. A time error compensator for receiving a train of time-spaced signals transmitted in repetitive sequence comprising, in combination:

counter means adapted to receive said sequence of time-spaced signals and issue a separate gating signal in response to each of said time-spaced signals;

presettable delay means adapted to receive the sequence of time-spaced signals and to delay each signal by a predetermined amount in response to a present signal; and gating means including means providing selected preset signals, said gating means being connected between said counter means and delay means and issuing a selected preset signal to said delay means in response to each of said gating signals for delaying each of said time-spaced signals by an individually predetermined amount.

2. The compensator as defined in claim 1 in which said delay means is controlled by the magnitude of said preset signal, and said gating means comprising, a plurality of individual gates each having a separate impedance coupled to said delay means for issuing a preset signal thereto in response to an associated on of said gating signals, said preset signal having a magnitude dependent on the value of such impedance and all but one of said impedances being adjustable.

3. The compensator as defined in claim 1, further comprising, an additional delay means having an output connected to said counter means and an input adapted to receive said sequence of time-spaced signals, said additional delay means providing a predetermined phase difference between the time-spaced signals received by said counter means and corresponding signals received by said presettable delay means.

4. The compensator as defined in claim 3, said additional delay means being further characterized in that the delay provided thereby is selected to delay each of said time-spaced signals by an amount in time such that the time-spaced signals received by said counter means occur alternately in time with respect to corresponding signals received by said presettable delay means.

5. A method of compensating for periodic timing errors in a tachometer output signal wherein such signal consists of a number of pulses per tachometer revolution, comprising the steps of:

developing a train of gating signals having a repetitive sequence corresponding to said number of pulses per tachometer revolution and being alternately spaced in time therewith;

generating a control signal having a discrete but adjustable magnitude in response to each said gating signal;

feeding said pulses from said tachometer through a presettable delay network;

comparing time spacing between the pulses issued by said presettable delay network with a known reference time spacing; and applying said control signals to said presettable delay network and adjusting the magnitude thereof to cause the time spacing between the pulses issued by said presettable delay network to match said known reference time spacing.

6. A tachometer time error compensator comprising in combination:

a tachometer generating a number of pulses each revolution;

a presettable delay network adapted to receive said pulses and provide corresponding but delayed output pulses in response thereto, said presettable network having a control input means for receiving a preset signal with the degree of delay being dependent upon the magnitude of the preset signal;

an additional delay network connected to receive said pulses from said tachometer and delay each pulse by a predetermined phase amount with respect to corresponding pulses received by said presettable delay network;

counter means connected to the additional delay network to receive the delayed pulses therefrom and including a plurality of logic gates equal in number to the number of pulses per each revolution of said tachometer, said logic gates each having an output issuing a gating signal in response to a separate one of said pulses received from said additional delay network; and a plurality of control gates each adapted to assume on or off conductive states in response to a gating signal, each said control gate connected to one of said logic gates to receive one of said gating signals, each of said control gates having an individual resistance connected to the input means of said presettable delay network, the individual resistances being selected such that the degree of time spacing between successive signals from said presettable delay network assumes a desired amount during normal operation of the tachometer.

References Cited

UNITED STATES PATENTS

| | | | |
|---|---|---|---|
| 2,960,568 | 11/1960 | Leyton | 179—100.2 |
| 3,202,769 | 8/1965 | Coleman | 328—109 |

RUDOLPH V. ROLINEC, Primary Examiner

M. J. LYNCH, Assistant Examiner

U.S. Cl. X.R.

179—100.2; 317—6; 340—174.1